(12) United States Patent
Tewksbary

(10) Patent No.: US 8,170,981 B1
(45) Date of Patent: May 1, 2012

(54) COMPUTER METHOD AND SYSTEM FOR COMBINING OLTP DATABASE AND OLAP DATABASE ENVIRONMENTS

(75) Inventor: David Edward Tewksbary, Bolton, MA (US)

(73) Assignee: Dassault Systemes Enovia Corporation, Lowell, MA (US)

( * ) Notice: Subject to any disclaimer, the term of this patent is extended or adjusted under 35 U.S.C. 154(b) by 22 days.

(21) Appl. No.: 12/963,428

(22) Filed: Dec. 8, 2010

(51) Int. Cl.
*G06F 7/00* (2006.01)
*G06F 17/00* (2006.01)

(52) U.S. Cl. .................................................. 707/600
(58) Field of Classification Search .................. None
See application file for complete search history.

(56) References Cited

U.S. PATENT DOCUMENTS

| | | | |
|---|---|---|---|
| 6,480,842 B1 | 11/2002 | Agassi et al. | |
| 7,685,146 B2 * | 3/2010 | Wu et al. | 707/999.101 |
| 7,743,015 B2 * | 6/2010 | Schmitt | 707/600 |
| 7,756,822 B2 * | 7/2010 | Danner et al. | 707/602 |
| 2009/0164486 A1 * | 6/2009 | Foeldesi et al. | 707/100 |

* cited by examiner

*Primary Examiner* — Uyen T. Le
(74) *Attorney, Agent, or Firm* — Hamilton, Brook, Smith & Reynolds, P.C.

(57) ABSTRACT

A computer system provides access to both an online transaction processing (OLTP) database server and an online analytics processing (OLAP) database server. The computer system includes a client application adapted to receive a query. According to (a) mode of operation (e.g., read or update) of the client application and (b) synchronization status of the OLAP database server, the client application redirects the query to the OLTP database server or to the OLAP database server. The client application redirects the query to the OLTP database server when the mode of operation is other than a read-only operation or the synchronization status is "unsynchronized". The client application redirects the query to the OLAP database server when the mode of operation is a read-only operation and the synchronization status is "synchronized". The computer system further includes an OLTP application server (e.g., Enovia V6) comprising an OLTP adapter and an OLAP adapter. The OLAP adapter is formed of a mapping component adapted to map data between OLTP semantics and OLAP semantics.

11 Claims, 5 Drawing Sheets

FLOW FOR "END DATABASE INTERACTION"

COMPUTER METHOD AND SYSTEM FOR COMBINING OLTP DATABASE AND OLAP DATABASE ENVIRONMENTS

BACKGROUND OF THE INVENTION

Enterprise customers typically maintain two types of database environments. First, relational databases are used in an On Line Transaction Processing (OLTP) environment to support transaction-oriented applications, like those developed by Dassault Systemes under the trademarks CATIA, ENOVIA, DELMIA, etc. Second, derived copies of the OLTP data are created for On Line Analytics Processing (OLAP), for value-add applications like business intelligence, reporting, and decision support. Historically OLAP environments also use relational database technology, but this is changing as storage systems tailored for OLAP use are becoming widely available. The Dassault Systemes brand Exalead® is an example of a modern OLAP repository.

Today, OLTP and OLAP environments are entirely disjoint, and applications are designed to support one environment or the other. The separation of these multiple database environments leads to suboptimal use of computing resources, duplication of effort, manual synchronization of data, and a host of other problems.

The following is in regards to art related to the combination of OLAP/OLTP systems. G. Danner, et al, in U.S. Pat. No. 7,756,822 present a federated view of OLAP/OLTP data. The disclosed system provides a combined view of content across OLAP and OLTP, where the data in each system is considered disjoint. Next Danner, et al. calculate this combined view by transforming contents of the OLTP system. Lastly, Danner, et al. provide an environment to support OLAP applications.

U.S. Pat. No. 7,743,015 by Schmitt is similar to U.S. Pat. No. 7,756,822. Schmitt focuses on building a consolidated data cube from OLAP and OLTP, starting with OLAP data and appending unsynchronized information from OLTP. There is no mention of data transformation (either implied or assumes single semantic). Schmitt provides an environment to support OLAP applications.

U.S. Pat. No. 6,480,842 by Agassi, et al. manages bi-directional relationships between data held in OLAP and OLTP. The Agassi et al, approach navigates from OLAP query results back to OLTP data, and navigates from OLTP query results back to OLAP data. Agassi, et al, does not present a combined view, instead they define a new class of OLAP application.

There is a need for leveraging both OLAP and OLTP environments from an application server that has significant transactional needs. An example of such an application server is ENOVIA V6 which provides an object modeling environment to application developers. The ENOVIA V6 object model supports authoring operations and assumes a highly concurrent multi-user environment, thus has strong needs for transactions and OLTP. However, many operations in ENOVIA V6 are read-only, and do not need transaction semantics, and thus applications could be handled more efficiently by an OLAP database server. It is highly desirable for the application developer to work from a single point of reference and let the application server decide which database server is appropriate for a given operation. However, there are no known programming frameworks (application servers) that provide transparent access to both OLAP and OLTP databases.

There are two main problems to be solved. The first is that the semantic level of the data in the OLAP and OLTP database servers may be different. The OLAP data is derived from OLTP data, but is typically altered somewhat by the Extract/Transform/Load (ELT) process that populates the OLAP database. Secondly, when accessing the OLAP database system, the framework (i.e. application server) must guarantee that any changes written on the OLTP database side have been synchronized with the OLAP database server. This guarantee is necessary to ensure the application has a consistent view of data across both database server environments.

SUMMARY OF THE INVENTION

The present invention addresses the above shortcomings and needs in the art. In particular, embodiments of the present invention provide:

1) Integration of OLAP and OLTP database systems to support OLTP applications;

2) Transformation of data between OLAP and OLTP semantics; and

3) Determination of system of reference (either OLAP or OLTP) based on management of OLTP version stamp (no federation).

In one embodiment, a computer system provides access to both an OLTP database server and an OLAP database server. The computer system comprises a client application and an OLTP application server. The client application is adapted to receive a query and redirects the query to the OLTP database server or to the OLAP database server according to (a) mode of operation (read or update) of the client application and (b) synchronization status of the OLAP database server. The client application redirects the query:

to the OLTP database server when the mode of operation is other than a read-only operation or the synchronization status is "unsynchronized" and to the OLAP database server when the mode of operation is a read-only operation and the synchronization status is "synchronized".

The OLTP application server (e.g., Enovia V6) comprises an OLTP adapter and an OLAP adapter. The OLAP adapter includes a mapping component adapted to map data between OLTP semantics and OLAP semantics.

In embodiments, the OLAP adapter maps the query from the OLTP semantic to the OLAP semantic.

Further the OLAP adapter may map results of the query from the OLAP semantic to the OLTP semantic.

Embodiments may further comprise a version indicator stored at the OLTP database server. The version indicator indicates the last completed synchronization between the OLTP database server and the OLAP database server. The OLTP application server may copy the version indicator into a session state of the client application, and the client application redirects the query to the OLAP database server when the version indicator stored at the OLTP database server has changed relative to the copy of the version indicator in the client application.

Other embodiments are in the form of a computer-implemented method and/or a computer program product carrying out the above operations and functions.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

Figure 1:
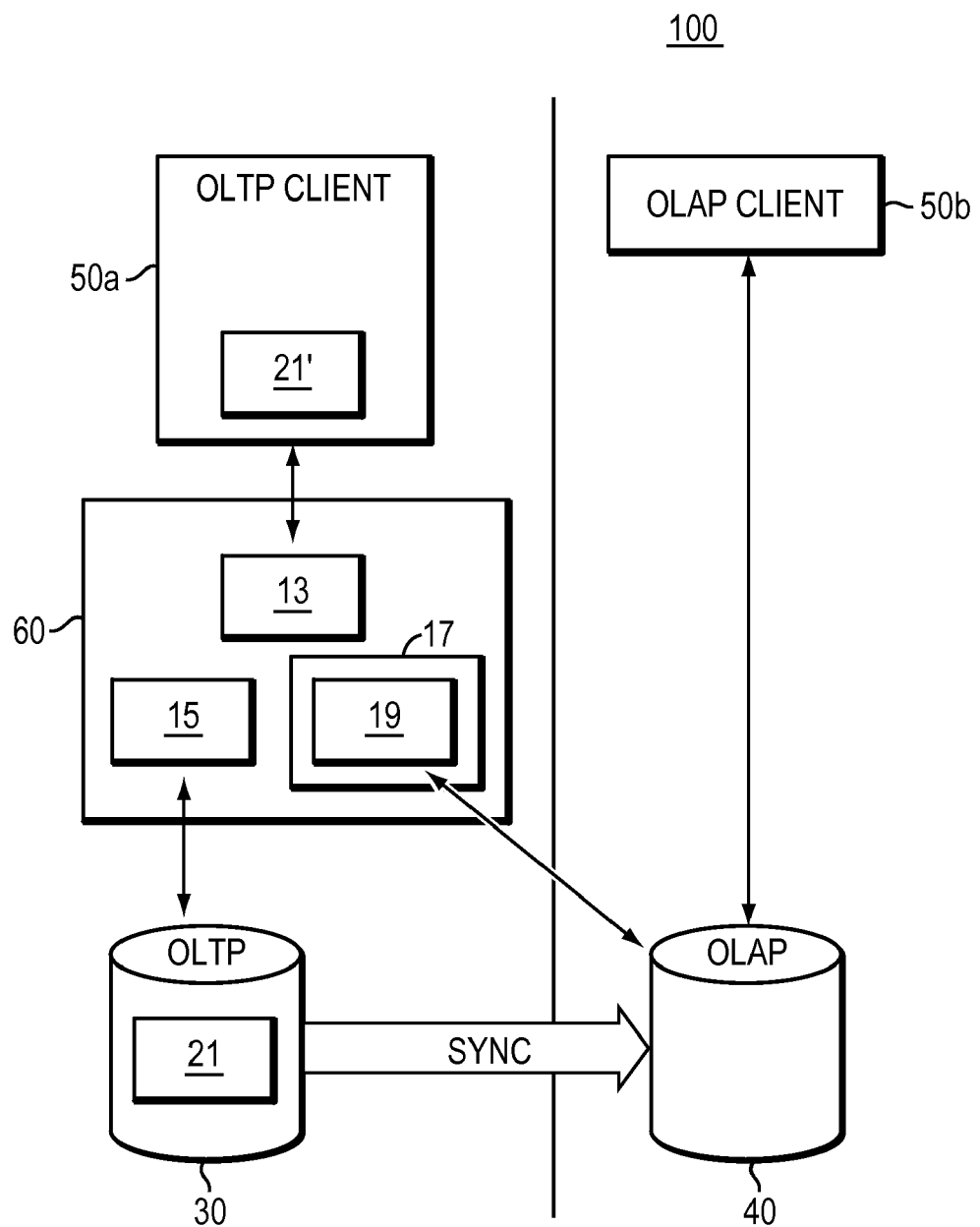
FIG. 1 is a block diagram of one embodiment of the present invention.

Illustrated in FIG. 1 is a computer database system, apparatus and method 108 embodying the present invention.

System 100 includes OLTP database system 30 and OLAP database system 40. The OLAP database system 40 is generally configured as common in the art and accessible by OLAP clients 50b. In addition, as will be made clear below, the OLTP database system 30 and application server 60 access and synchronize data with the OLAP database 40.

The application server 60 supports OLTP clients 50a. The application server 60 is formed of a database adapter abstractor 13, an OLTP adapter 15 and an OLAP adapter 17. Using techniques common in the art, the database adapter 13 abstracts information from the OLTP database 30 operations and serves to isolate OLTP clients 50a from implementation details. The OLTP adapter 15 implements the OLTP database interface using techniques known in the art, i.e., translates query requests and results between the OLTP client 50a and OLTP database server 30.

The OLAP adapter 17 implements the OLAP database 40 interface. OLAP adapter 17 employs a mapper 19 mapping OLAP data into OLTP database 30 semantics. The mapper 19 also maps OLTP data into OLAP database 40 semantics.

In response to OLTP client 50a queries and operations, by default, application server 60 directs OLTP client applications 50a to the OLAP database system 40 through OLAP adapter 17. However, once a client 50a performs an update operation, the application server 60 redirects the client 50a to the OLTP database system 30 (via OLTP adapter 15) and the client 50a remains on the OLTP database system 30 until (1) the client 50a update operation is complete, (2) the changes are written to OLTP database 30, and (3) the OLTP database system 30 has been synchronized with OLAP database 40. In practice this time interval may be between a few seconds to a few minutes. The end result is that all 'casual' use of the system 100 is supported by the OLAP database system 40 (browsing, viewing, etc). The OLTP database system 30 is only involved when an authoring (or otherwise non-read only) session begins, and then only for just as long as possible.

The problem of differing database semantics has two components. The first is that the derived data that is populated in the OLAP database server 40 must be mappable 1:1 with the original data authored in OLTP database system 30. That is, it must be possible to take information stored in the OLAP database 40 and transform it back to the original OLTP database 30 representation. In turn, application server 60 has a corresponding/cooperating connector that can understand and support bi-directional mapping of the OLAP database 40 content using the OLTP database 30 data definition as a baseline. This connector is mapper 19 and is used to redirect queries originating in the application server 60 from the OLTP database system 30 to the OLAP database system 40. Mapper 19 maps the description of the query into the OLAP database system 40 and maps the results of the query back into the OLTP database 30 definitions. This allows the application server 60 to present the same results to the OLTP client application 50a whether the OLAP or OLTP database system 40, 30 is used.

The second problem, knowing when to access the OLAP database system 40 versus the OLTP database system 30, requires the application server 60 to 1) understand the mode of operation being performed (e.g., read or update), and 2) know when the last updates from a client 50a have been pushed into the OLTP database 30 environment and are available for subsequent queries. The first of these requirements may at first seem somewhat trivial, since the application server 60 knows the operation mode as part of its published API. The second requirement can be supported by providing a version stamp 21 on the OLTP data store 30 to represent the last completed synchronization between the OLTP database 30 and OLAP database 40. In embodiments, the version stamp 21 may be implemented in several ways, an integer or a timestamp or other indicator for example. When a transaction is done to the OLTP database 30, the application server 60 copies the version stamp 21 from the OLTP database 30 into the session state of the client 50a that performed the transaction. At the beginning of each subsequent client 50a operation, this client copy of the version stamp 21' is checked against the current version stamp 21 stored in the OLTP data store 30. When version stamp 21 of the OLTP data store 30 has changed, it means that synchronization is complete and the client 50a can be redirected to the OLAP database server 40.

In one embodiment, synchronization is actually accomplished by a background process that polls every few seconds to look for changes to push into the OLAP database 40 environment. When the background process detects that changes are needed, it increases the version stamp 21 on the OLTP vault 30 when complete.

An additional detail is that an application server 60 may choose to partition data into multiple stores or 'vaults'. In this case, the synchronization and client 50a redirection may be performed on a 'vault' level. If, for example, one vault is used for WIP (Work In Progress) data and another is used for supplier data, then an update to the WIP vault will not cause access to the supplier vault to be redirected to the OLTP database server 30.

Pushing load of interactive applications to the OLAP database server 40 results in many efficiencies. First, pushing more work to the OLAP database 40 environment while off-loading the OLTP database 30 environment will serve to balance workload in a typical IT environment. Secondly, it provides an efficient and inexpensive alternative to database replication, and allows horizontal scaling of the database tier. Finally, if the OLAP database system 40 uses a modern non-relational storage technology, radical gains in application scalability are possible as these systems often perform at much higher levels than relational engines for read-only operations.

Figure 2:
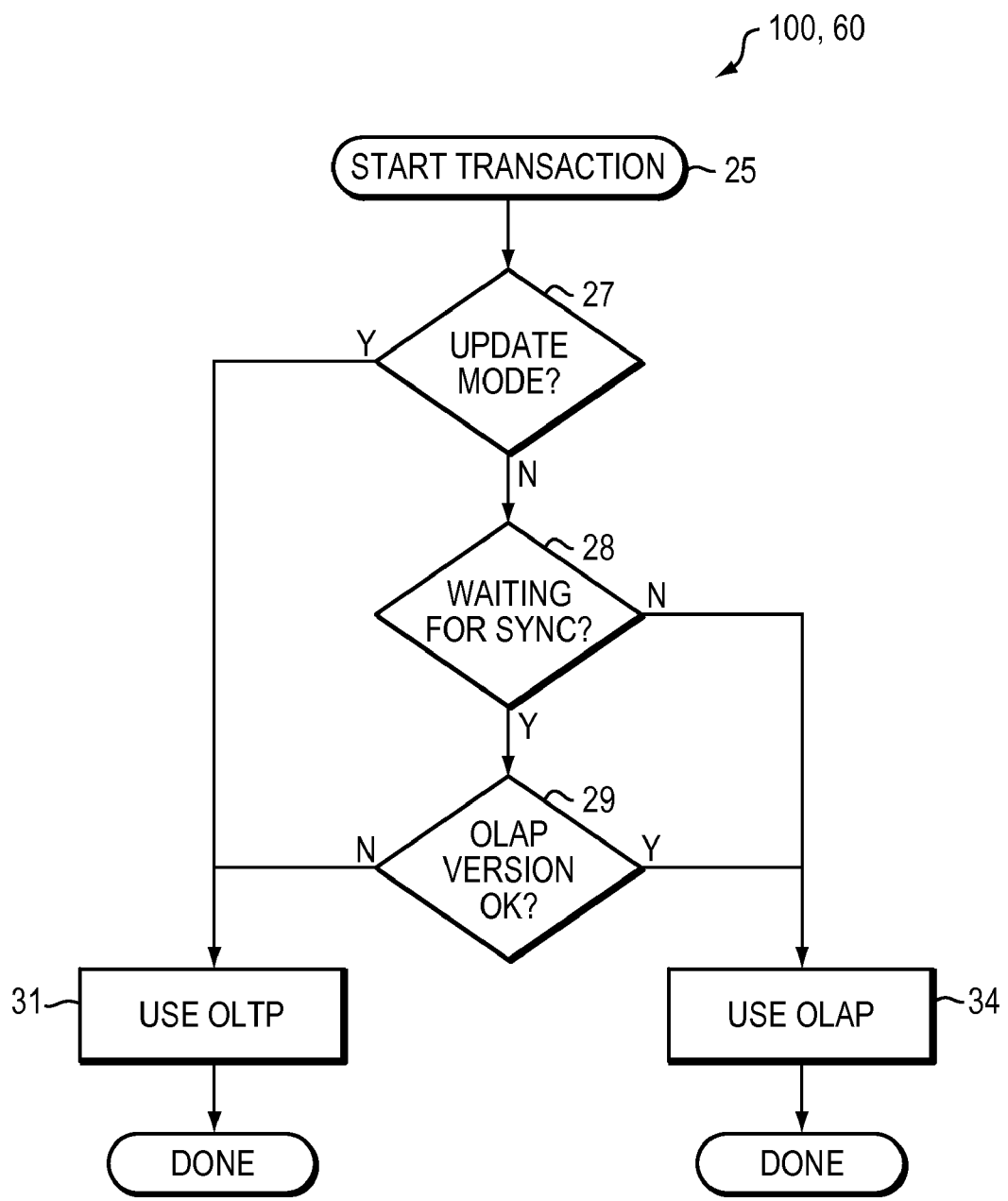
FIGS. 2 and 3 are flow diagrams of the database interoperations in the embodiment of FIG. 1.
Figure 3:
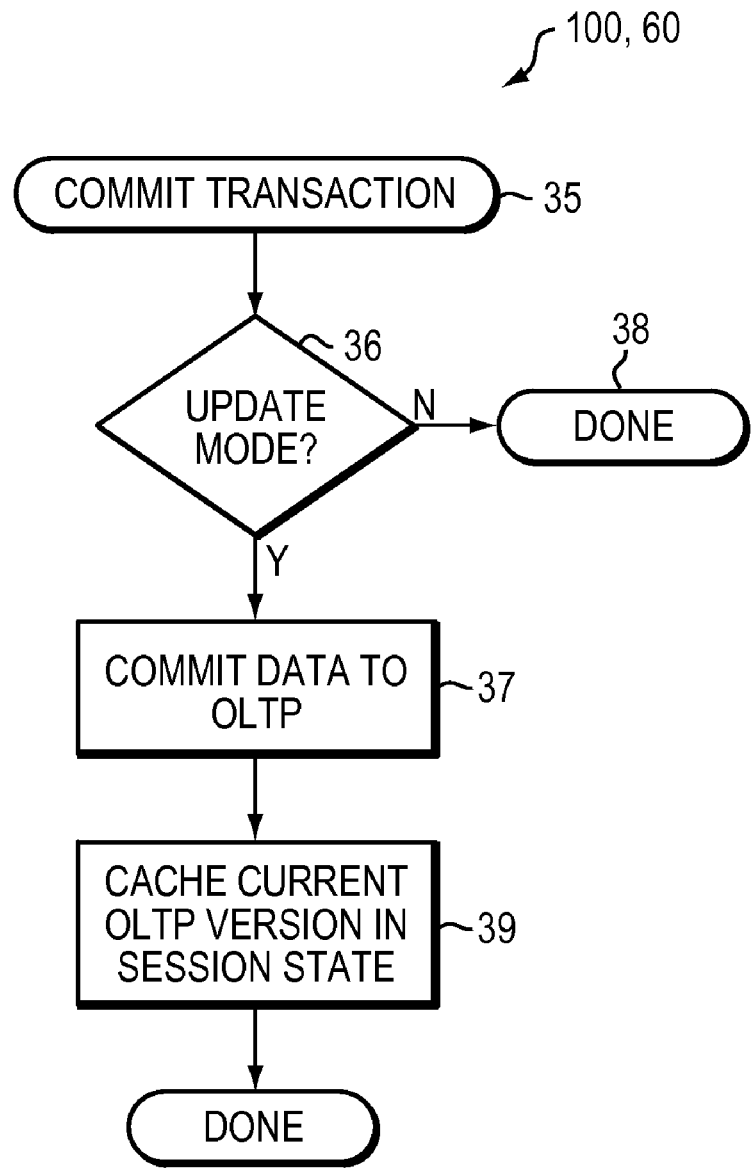

FIGS. 2 and 3 further describe the pertinent operations of invention system 100 and application server 60. Responsive to client application 50a request or command to begin database interaction, application server 60 starts a transaction at 25. Next at step 27, application server 60 determines whether the mode of operation of client application 50a is other than a read-only operation (e.g., an update mode). If the mode of operation is "update" or non-read only at step 27, then step 31 directs use of the OLTP database 30 and operation processing continues as usual (i.e., by OLTP database interface handling via OLTP adapter 15).

If the mode of operation is not "update" or non-read only at step 27, then step 28 determines synchronization status of the OLAP database server 40. If step 28 need not wait for synchronization, i.e. status is "synchronized," then step 34 directs use of the OLAP database 40. And operation processing continues through OLAP adapter 17 handling of OLAP database 40 interfacing and mapper 19 mapping between OLAP database 40 and OLTP database 30 semantics.

If synchronization status of step 28 is "unsynchronized" (i.e. waiting for synchronization), then step 29 checks version indicator 21. If the version stamp 21 stored at the OLTP data store 30 is different than the subject client application 50a copy of the version stamp 21', then synchronization has completed and step 34 redirects the client application 50a to the OLAP database server 40. Thereafter, operation continues through OLAP adapter 17 providing OLAP database 40 interfacing and mapper 19 mapping between OLTP and OLAP database 30, 40 semantics.

If step 29 determines that the version stamp 21 stored in OLTP database server 30 is the same as the client application 50a copy of the version stamp 21', then step 31 directs client application 50a to the OLTP database server 30. Operation thereafter is as described above.

With reference to FIG. 3, after client application 50a commits a given transaction 35, system 100/application server 60 ends database interaction as follows. At step 36, application server 60 checks mode of operation (e.g. read or update). If step 36 determines the mode of operation is read-only, then database interaction is ended at step 38.

Otherwise, step 37 commits subject data to the OLTP database 30. In turn, the above-mentioned background process pushes (synchronizes) changes to the OLAP database 40 and increases (updates) the version stamp 21 at OLTP database server 30 when synchronization is complete.

Next, step 39 caches the current OLTP database version stamp 21 in the session state of OLTP client 50a and database interaction/processing ends.

Figure 4:
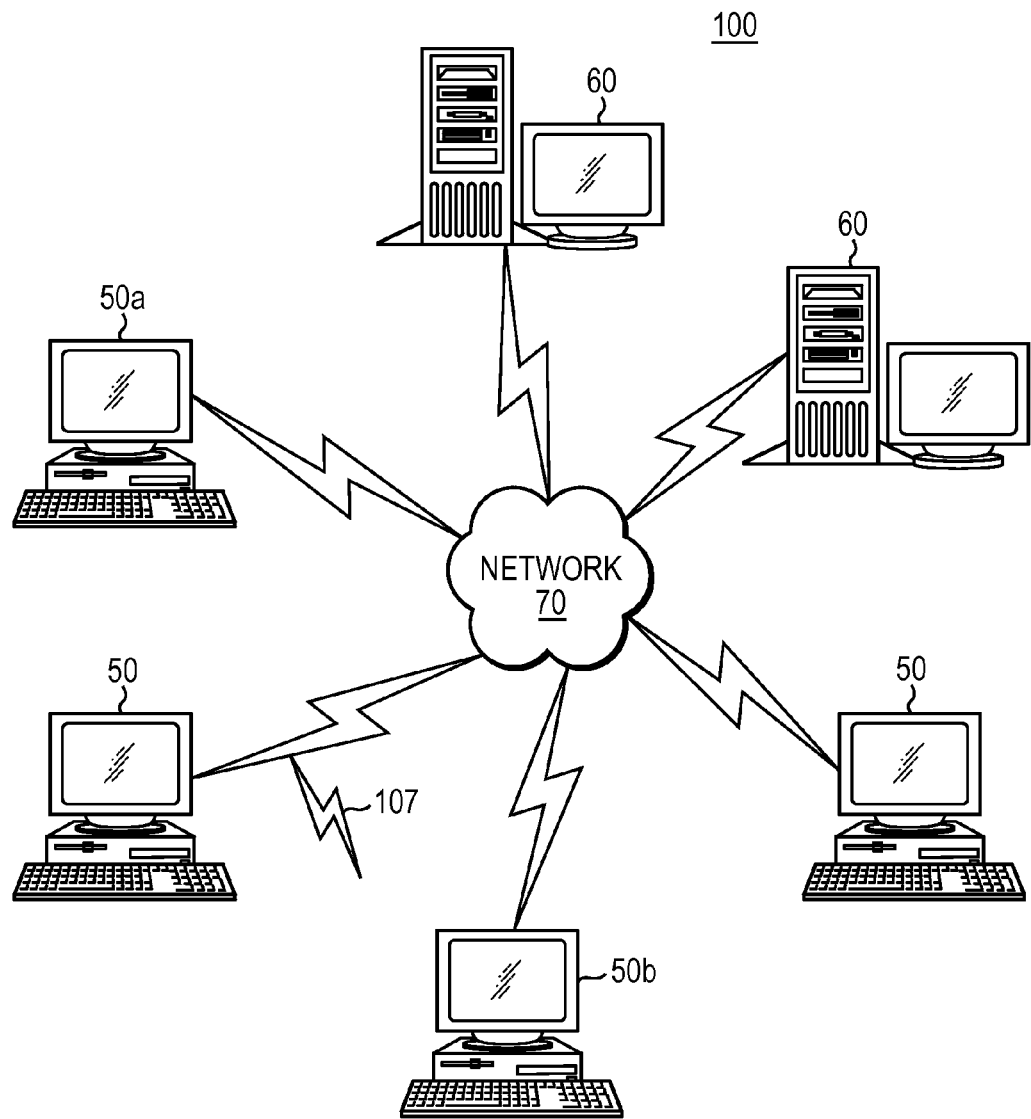
FIG. 4 is a schematic view of a computer network in which embodiments of the present invention operate.

FIG. 4 illustrates a computer network or similar digital processing environment in which the present invention may be implemented.

Client computer(s)/devices 50 (including clients 50a, b) and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 5:
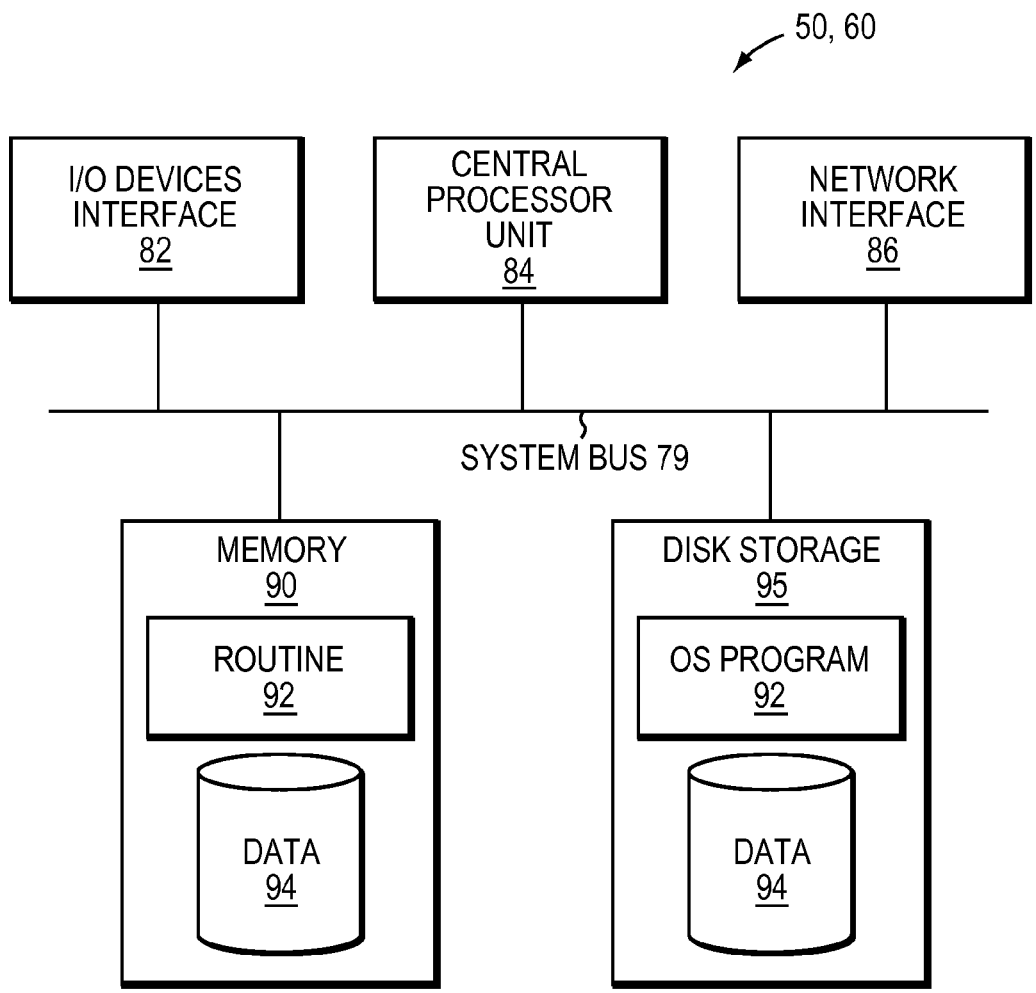
FIG. 5 is a block diagram of a computer node in the FIG. 4 network.

FIG. 5 is a diagram of the internal structure of a computer (e.g., client processor/device 50 or server computers 60) in the computer system of FIG. 4. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 4). Memory 90 provides volatile storage for computer software instructions 92 and data 94 used to implement an embodiment of the present invention (e.g., application server 60, OLAP adapter 17, mapper 19, version indication 21 and supporting code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A computer system providing access to both an online transaction processing (OLTP) database server and an online analytics processing (OLAP) database server, comprising:
   a client application adapted for receiving a query and redirecting the query to the OLTP database server or to the OLAP database server according to (a) mode of operation of the client application and (b) synchronization status of the OLAP database server, the client application redirecting the query:
    to the OLTP database server when the mode of operation is other than a read-only operation or the synchronization status is "unsynchronized" and
    to the OLAP database server when the mode of operation is a read-only operation and the synchronization status is "synchronized";

and
  an OLTP application server comprising an OLTP adapter and an OLAP adapter, the OLAP adapter comprising a mapping component adapted to map data between OLTP semantics and OLAP semantics.

2. A computer system as claimed in claim 1 wherein the OLAP adapter maps the query from the OLTP semantic to the OLAP semantic.

3. A computer system as claimed in claim 1 wherein the OLAP adapter maps results of the query from the OLAP semantic to the OLTP semantic.

4. A computer system as claimed in claim 1 further comprising a version indicator stored at the OLTP database server and indicating last completed synchronization between the OLTP database server and the OLAP database server.

5. A computer system as claimed in claim 4 wherein the OLTP application server copies the version indicator into a session state of the client application, and
    the client application redirects the query to the OLAP database server when the version indicator stored at the OLTP database server has changed relative to the copy of the version indicator in the client application.

6. A computer implemented method providing access to both an online transaction processing (OLTP) database server and an online analytics processing (OLAP) database server, comprising:
    in a client application, receiving a query and redirecting the query to the OLTP database server or to the OLAP database server according to (a) mode of operation of the client application and (b) synchronization status of the OLAP database server, said redirecting the query being:
        to the OLTP database server when the mode of operation is other than a read-only operation or the synchronization status is "unsynchronized" and
        to the OLAP database server when the mode of operation is a read-only operation and the synchronization status is "synchronized";

and
  mapping data between OLTP semantics and OLAP semantics.

7. A method as claimed in claim 6 wherein the mapping includes mapping the query from the OLTP semantic to the OLAP semantic.

8. A method as claimed in claim 6 wherein the mapping includes mapping results of the query from the OLAP semantic to the OLTP semantic.

9. A method as claimed in claim 6 further comprising indicating last completed synchronization between the OLTP database server and the OLAP database server.

10. A method as claimed in claim 9 wherein indicating includes storing a version indicator at the OLTP database server; and
  the method further comprises:
  copying the version indicator into a session state of the client application,
and
  redirecting the query to the OLAP database server when the version indicator stored at the OLTP database server has changed relative to the copy of the version indicator in the client application.

11. A computer program product providing access to both an online transaction processing (OLTP) database server and an online analytics processing (OLAP) database server, the computer program product comprising:
  a computer readable storage medium having computer readable program code embodied therewith, the computer readable program code including:
  computer readable program code configured to receive a query in a client application and redirect the query to the OLTP database server or to the OLAP database server according to (a) mode of operation of the client application and (b) synchronization status of the OLAP database server, said redirecting the query being:
    to the OLTP database server when the mode of operation is other than a read-only operation or the synchronization status is "unsynchronized" and
    to the OLAP database server when the mode of operation is a read-only operation and the synchronization status is "synchronized";
and
  computer readable program code configured to map data between OLTP semantics and OLAP semantics.

\* \* \* \* \*